G. W. COPELAND.
LASTING GIRTHS FOR LASTING BOOTS AND SHOES.

No. 183,539. Patented Oct. 24, 1876.

WITNESSES
Frank G. Parker
F. F. Raymond 2d

INVENTOR
Geo. W. Copeland

UNITED STATES PATENT OFFICE.

GEORGE W. COPELAND, OF MALDEN, MASSACHUSETTS.

IMPROVEMENT IN LASTING-GIRTHS FOR LASTING BOOTS AND SHOES.

Specification forming part of Letters Patent No. 183,539, dated October 24, 1876; application filed August 28, 1876.

*To all whom it may concern:*

Be it known that I, GEORGE W. COPELAND, of Malden, in the county of Middlesex and State of Massachusetts, have invented an Improvement in Lasting-Girths, of which the following is a specification:

This invention relates to the construction and shaping of girths employed in girth-lasting, and in an improvement upon the girths described in two or three of my pending applications.

Reference is made to the accompanying drawing, forming a part of this specification, in explaining the nature of my invention, in which—

Figure 1:
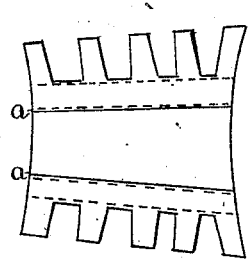
Figure 2:
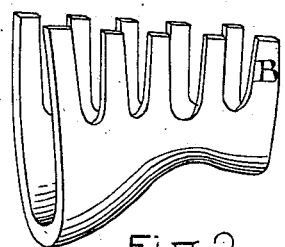
Figure 3:
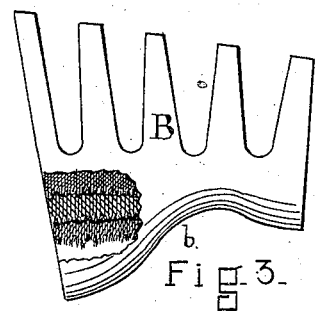
Figure 4:
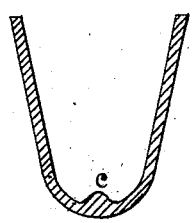
Figure 5:
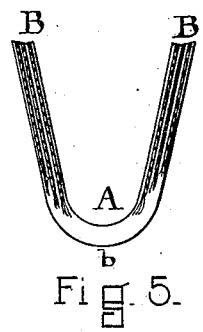
Figure 6:
Figure 7:
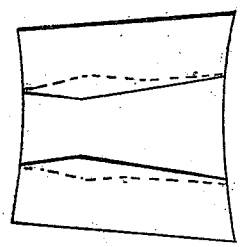
Figure 8:
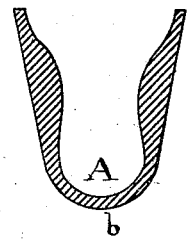
Figure 9:
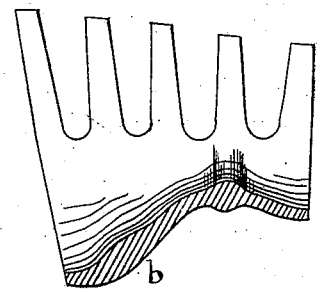
Figure 10:
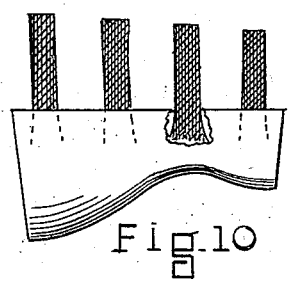

Figure 1 is a plan of a girth having an extensible central band and inextensible edges. Fig. 2 is a perspective of the formed girth. Fig. 3 is a side elevation of the same with the side broken out, showing the construction. Fig. 4 is a cross-section, showing the central rib. Fig. 5 is a cross-section, showing the fibrous edges. Fig. 6 is a longitudinal section. Fig. 7 is a plan of a gored girth. Fig. 8 is a cross-section, showing side pads. Fig. 9 is a longitudinal section, showing varying thicknesses. Fig. 10 is an elevation, showing an elastic girth and inelastic finger-strap vulcanized therein.

Heretofore the girths employed in compressing an upper to and upon a last have been perfectly flat and of a uniform thickness, of a shape substantially like the girth represented in Fig. 1; they also have been made wholly or in part elastic, with the elasticity abruptly ending at the line of union with the inelastic portion, as represented in Fig. 1 at *a.*

My improvement consists, first, in forming the girth to the general shape of a straight last, by vulcanizing in molds of the required shape; second, in distributing the degree of elasticity, and in so forming the girth as to develop more strain upon the last on some portions of its surface than upon others; third, in making the union between the elastic and inelastic portions gradual, so that the elasticity may not suddenly cease along a defined line; fourth, in the manner of uniting the inelastic and elastic portions of the girth.

From the above description it will be seen that the girth consists of elastic and inelastic bands, that the elastic portion is, preferably, the central band, and that the inelastic edges may consist of a series of projections, forming straps, by which the girth may be attached to fingers, jaws, or any operating mechanism designed to produce a strain upon it; but although I only show the elasticity at the central band of the girth, yet I do not confine myself to that arrangement and combination of elastic and inelastic portions. I may, if desirable, secure my stretch wholly or partly in the straps, or in any intermediary part between the finger-straps. As above set forth, a girth may be molded to get the desired contacting surface, and by the same process— namely, forming in molds under pressure by vulcanization—the varying thicknesses may be obtained and distributed, and the elastic and inelastic parts joined.

In Figs. 2, 3, 6, 9, and 10 I show the central elastic band A shaped along its mean central line *b* to conform to the general contour of a last from instep to toe, and this band, together with the inelastic edges B, is shaped to conform to the hollow in the surface of the last generally existing between instep and toe; and this rule may be generally followed, that the contacting surface of the girth should be made to conform to any depression on the surface of the last. When necessary, I thicken the girth, in order to secure a greater strain. This construction is shown in Fig. 9, and the mean central portion of the central band may be thickened, as shown in Fig. 4 at *c*, when it is desired to have the straining action take place nearer the edge of the girth. A flat girth may be made to conform to the surface of the last by goring its central band, substantially as shown in Fig. 7. I prefer to make the inelastic portions of canvas, or other fibrous material, and rubber, and to so arrange them, in connection with elastic portions, that there shall be no determined line along their union. I take two or more thicknesses of a fibrous material, C, of an unequal width, and arrange them so that the widest piece, which may be raveled or gored on its edge, may lap somewhat beyond the other pieces, and be embedded in the rubber comprising the elastic portion. The other piece or pieces are then added, alternately interposed with rubber, substantially as shown, and the whole is united by compression and vulcanization; or the cloth or fabric may extend through the whole girth to or including the finger-straps, in which case the central or elastic portion must be so woven that it will readily stretch with the rubber, while the rest may be so woven or made as to be as inelastic as desired. The finger-straps D may be extensions of the fibrous edges, or they may be united thereto by sewing, riveting, or in any desired manner. A roughened surface may be employed, if necessary.

A modification of the principle of varying thicknesses in the lasting-girth, to secure varying strains upon the upper, is shown in Fig. 8, where the girth is bulged inwardly upon each side. This feature is particularly adaptable to shank-lasting, or in lasting uppers or parts of uppers, where it is desirable to secure a displacement of the same in fitting it to the last's surface without exerting a great strain upon the girth.

The advantages of this invention consist, first, in shaping the girth to develop an even and uniform strain upon the upper; second, in joining the elastic and inelastic portions, substantially as described; third, in increasing the strain upon the depressed surfaces of the last; and, fourth, in molding the girth into such shapes and forms that a strain exerted upon the edges thereof causes the girth to so conform to the surface of the last that the upper is fitted, compressed, and smoothed upon the same, and also in adjusting the degree of strain upon the upper by the said shaping and forming of the girth, so that the more difficult parts to fit to the last are subjected to a greater strain than that used upon the other portions of the upper.

Of course I do not confine myself to the employment of a girth particularly adapted to last the upper between instep and toe, but may use the principles as above described in a girth shaped to envelop the entire upper, or in one employed in lacing but a small portion thereof to the last.

Having thus fully described my invention, I claim and desire to secure by Letters Patent—

1. A lasting-girth of formative material, molded to a shape conformable to the surface of the last upon which it operates, substantially as shown and described.

2. A lasting-girth consisting of an elastic central band, A, partially elastic and fibrous intermediary bands, and inelastic fibrous edges, substantially as shown and described.

3. A lasting-girth having edges of two or more thicknesses of fibrous material, extended unequally into the elastic band, and united thereto by heat and pressure, substantially as shown and described.

4. A lasting-girth having elevated and depressed inner surfaces, conversely arranged to the concave and convex parts of a last's surface, substantially as and for the purpose described.

5. A lasting-girth provided with the longitudinal projection c along its central line, substantially as shown and described.

6. A lasting-girth of varying thicknesses, substantially as shown and described.

7. A lasting-girth bulged inwardly upon its sides, substantially as shown and described.

8. A lasting-girth having flexible edges of alternating elastic and fibrous material, substantially as shown and described.

9. A lasting-girth composed of a wholly elastic central portion and independent inelastic fingers, arranged in relation to each other so that the fingers are separated by elastic portions of the girth, substantially as shown and described.

10. A flat lasting-girth, consisting of a gored elastic central portion and inelastic flexible edges, substantially as shown and described.

GEO. W. COPELAND.

Witnesses:
THOS. WM. CLARKE,
F. F. RAYMOND, 2d.